Nov. 18, 1952    T. F. KRUMM    2,618,072
WHEEL GAUGE
Filed Nov. 28, 1947    2 SHEETS—SHEET 1
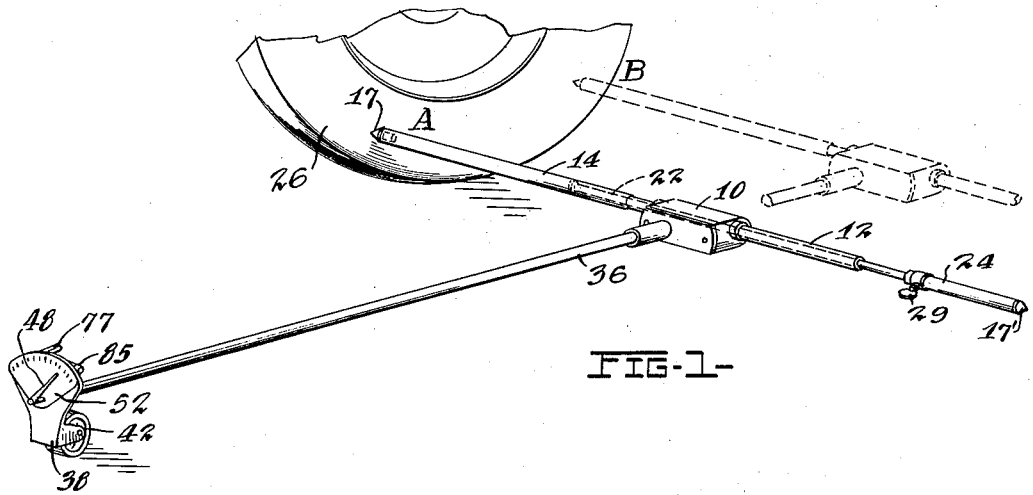
FIG-1-
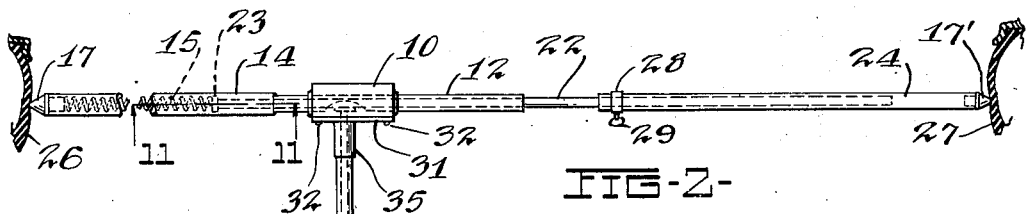
FIG-2-
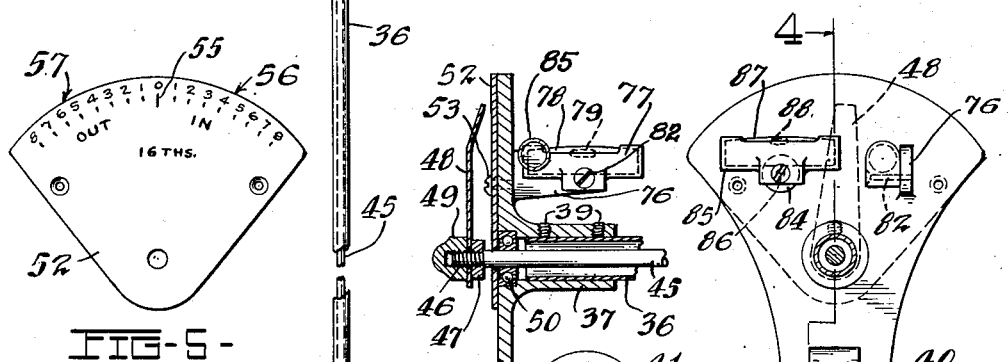
FIG-5-    FIG-4-    FIG-3-
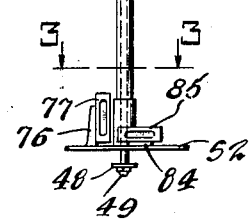
Inventor
Thomas F. Krumm
By
Harry O. Ernsberger
Attorney Nov. 18, 1952 — T. F. KRUMM — 2,618,072
WHEEL GAUGE
Filed Nov. 28, 1947 — 2 SHEETS—SHEET 2
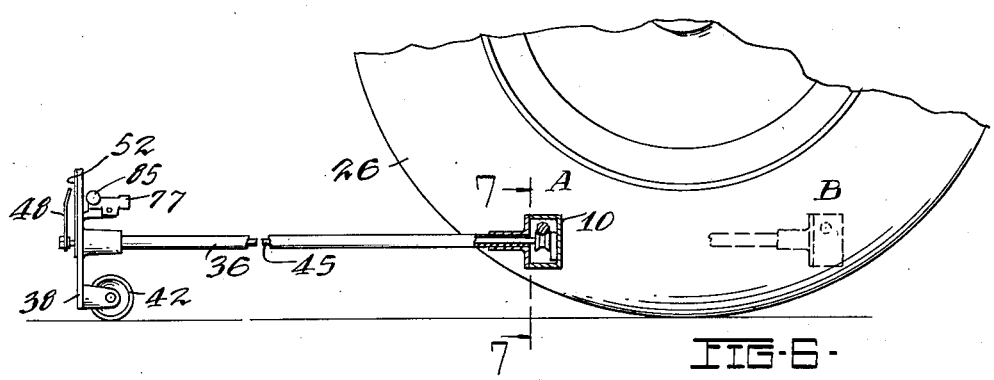
FIG-6-
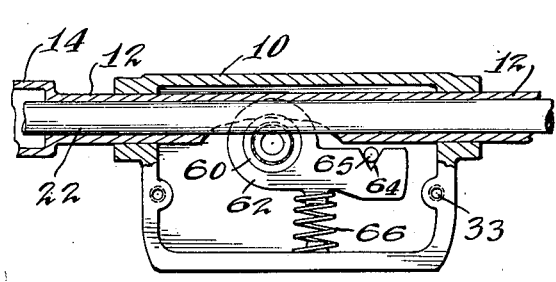
FIG-10-
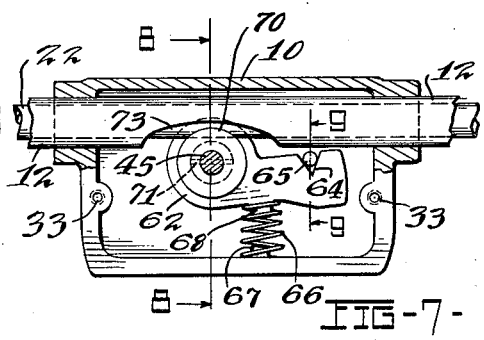
FIG-7-
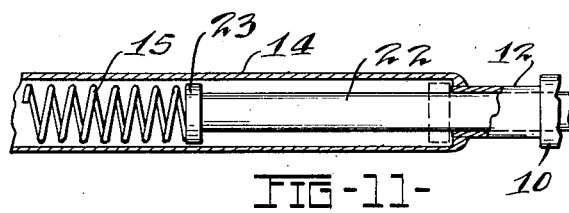
FIG-11-
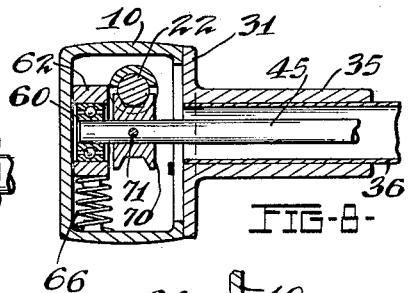
FIG-8-
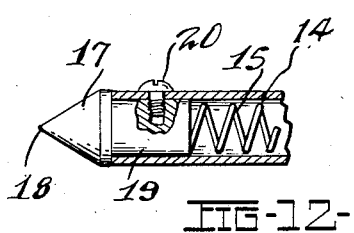
FIG-12-
FIG-9-
Inventor
Thomas F. Krumm
By Harry O. Ernsberger
Attorney Patented Nov. 18, 1952

2,618,072

UNITED STATES PATENT OFFICE 2,618,072

WHEEL GAUGE

Thomas F. Krumm, Toledo, Ohio

Application November 28, 1947, Serial No. 788,532

9 Claims. (Cl. 33—203.17)

1

This invention relates to vehicle wheel testing apparatus of a character for determining the condition of dirigible wheels of a vehicle and relates more particularly to a gauge for determining or measuring the "toe-in" of the wheels.

The invention comprehends the provision of a toe-in gauge or apparatus which may be quickly and easily engaged with the dirigible or steerable wheels of a vehicle for determining the condition of toe-in relationship of the wheels.

An object of the invention resides in the provision of a toe-in gauging device having means engageable with the steerable wheels of the vehicle and an indicating device for directly indicating the amount or condition of toe-in relationship of the wheels.

Another object of the invention is the provision of means for accurately determining fore and aft positions of the gauging means without the use of separate measuring means.

Another object of the invention resides in the provision of a toe-in gauge in which the apparatus contacting or engaging the vehicle wheels is made adjustable to accommodate varying widths of tread of vehicles.

Another object of the invention is the provision of leveling means associated with the gauge apparatus to aid in properly positioning the gauge mechanism in order to obtain accurate indication of the toe-in condition of vehicle wheels.

Still a further object is the provision of a frictional motion transmitting connection for translating movement from the gauge bar to an indicating means which may be quickly and easily manipulated during gauging operations and is not liable to become broken during use.

Still a further object of the invention is the provision of a toe-in gauge provided with an indicating means which extends forwardly of the vehicle to facilitate the reading of the indicator.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

2

Figure 1 is a perspective view of the gauge of my invention showing its application to the tire of a dirigible vehicle wheel;

Figure 2 is a top plan view of the toe-in gauge construction;

Figure 3 is a detail sectional view taken substantially on the line 3—3 of Figure 2;

Figure 4 is a sectional view taken substantially on the line on the line 4—4 of Figure 3;

Figure 5 is an elevational view of an indicator dial forming a part of the gauge construction;

Figure 6 is a side elevational view of the gauge construction, certain parts being shown in section;

Figure 7 is a detail sectional view taken substantially on the line 7—7 of Figure 6;

Figure 8 is a sectional view taken substantially on the line 8—8 of Figure 7;

Figure 9 is a fragmentary sectional view taken substantially on the line 9—9 of Figure 7;

Figure 10 is a view similar to Figure 7 with the indicating shaft removed;

Figure 11 is a sectional view taken substantially on the line 11—11 of Figure 2, and Figure 12 is a view showing one of the vehicle tire engaging elements and its mountings.

While I have illustrated the arrangement of my invention as particularly constructed and arranged for measuring the toe-in relationship of dirigible vehicle wheels, it is to be understood that I contemplate the utilization of the principles of my invention in any construction wherein the same may be found to have utility.

Referring to the drawings in detail, the gauge construction embodies means engageable with the tires of the front or dirigible wheels, the gauge mechanism arranged to remain in engagement with the wheels while the latter are rotated from an initial position to a second position for the purposes of providing an indication of the toe-in relationship. The gauge is inclusive of a reach-bar assembly which has a housing or fitting 10 through which extends a tubular member or guide 12, the tube 12 being fixedly secured in the housing 10 and is provided with an enlarged portion 14 within which is contained a resilient means in the form of an expansive coil spring 15. Disposed in the end of the enlarged portion 14 is a tire engagement element 17 having a conically shaped portion, the apex 18 of the element being adapted for direct engagement or contact with a vehicle tire. The member 17 is formed with a tenon 19 which extends into the extremity of the tubular member 14 and is held in place by screw 20 or similar means.

Slidably disposed within the tube 12 is a rod or shaft 22 having an abutment or head portion 23 at one end thereof engageable with the inner end of coil spring 15. The other end portion of the rod 22 is telescoped into a tube 24, the outer end of the latter being provided with a tire engaging element 17' of a construction identical with that hereinbefore described.

The elements 17 and 17' respectively engage the tires 26 and 27 as shown in Figures 1 and 2. Welded or otherwise secured to the tube 24 is a collar 28 having a transversely threaded opening adapted to receive a thumb or locking screw 29, the extremity of which is adapted for engagement with the rod 22 for securing the rod 22 in fixed adjustment with respect to the tube 24. The tubular members 12, 14 and 24, tire engaging elements 17 and the rod 22 form a reach bar assembly or a means spanning the space between the vehicle tires 26 and 27 from which a toe-in indication is derived in a manner hereinafter explained.

The spring 15 is of sufficient length to resiliently compensate for the differential in dimension of a toe-in condition so as to maintain the elements 17 and 17' in physical contact with the vehicle tires when the wheels are moved from an initial to a secondary position. An adjustment is provided between tube 24 and rod 22 through the medium of the thumb screw 29 to accommodate the gauge mechanism to vehicles having different widths of tread.

The housing 10 is provided with a cover or extension 31 held in place by means of screws 32 adapted to extend into threaded openings 33 formed in the housing 10. The cover or extension 31 is formed integrally with a shank portion 35 which is bored to snugly accommodate the end of a tube 36 which projects forwardly of the housing 10 in a direction substantially at right angles to the axis of the shaft 22. The other end of the tube 36 extends into a hollow shank 37 forming an integral part of a member or fitting 38 which carries the indicating mechanism of the gauge. As shown in Figure 4, the tube 36 is held in the shank 37 by means of set screws 39. The member 38 is formed with rearwardly extending spaced projections 40 which are bored to receive a suitable shaft or pin 41 upon which is journaled a caster or roller 42, the latter being for the purpose of supporting the indicating means of the gauge during operations.

Disposed within the tube 36 is a shaft or rod 45, the forward extremity of which is threaded as at 46 to receive an abutment or backing nut 47, an indicator hand 48 and a nut 49 for locking or securing the indicator hand to the shaft 45. The forward portion of the shaft 45 is suitably journaled in an anti-friction bearing 50 of the ball type contained within a recess formed in the member 38. The front face of member 38 is arranged to receive and support a dial or indicating plate 52 which is held in place by means of screws 53. As shown in Figure 5, the dial is provided with a central index 55 and two groups of graduations 56 and 57 for indicating positive and negative conditions of toe-in, the distance between each pair of graduations being equivalent to 1/16 of an inch toe-in of the wheels.

The shaft 45 extends into the housing 10 and is journaled in a suitable antifriction or ball bearing 60 which is mounted in a bore contained in member 62. The member 62 has a projecting portion provided with a V-shaped recess 64 into which projects a pin 65 carried by the housing 10. The member 62 is urged in a clockwise direction about the axis of pin 65 under the influence of resilient means in the form of an expansive coil spring 66 disposed between a wall of the housing 10 and member 62. A projection 67 upon the wall of the housing and a similar projection 68 upon member 62 serves to properly retain the spring in position as shown in Figure 7. Mounted upon shaft 45 is a grooved wheel or disc 70 secured to the shaft by means of a transversely extending pin 71. The peripheral groove in the wheel 70 is of a contour or configuration especially adapted to engage the cylindrical surface of the shaft or rod 22 as shown in Figures 7 and 8, whereby a friction drive is established between the shaft 22 and the wheel 70, the friction force or component for maintaining such drive being effected under the expansive pressure of the spring 66. As shown in Figure 7, a portion of the tube 12 is cut away or removed as at 73 to facilitate the frictional engagement of the wheel 70 with the shaft 22. The engagement of the walls of the V-shaped recess 64 with pin 65 provide a means for fixing the axis or rotation of member 62 so that there will be no lost motion between the shaft 22 and the grooved wheel 70 during gauging operations and yet the grooved wheel 70 may be slipped or rotated relative to shaft 22 by manipulating the indicator arm 48 so that the indicator may be brought to zero position viz., in registration with the index line 55 without affecting the initial relative position of the gauging rod 22.

In carrying out gauging or measuring operations of the mechanism, it is necessary to determine the proper amount of fore and aft movement of the vehicle wheels to obtain correct indications. In the arrangement of my invention, the two positions of the vehicle wheels in obtaining a toe-in indication or measurement is established or determined by the use of a spirit level. As shown in Figure 4, the member 38 is formed with a rearwardly extending ledge or shelf 76 upon which is supported a spirit level 77 including a level glass 78 partially filled with a suitable liquid to provide a bubble 79. The case 77 containing the level glass 78 is secured to the ledge 76 by means of a screw 82. The level glass 78 is arranged with respect to the tube 36 and the reach bar assembly engageable with the tires of the vehicle so that the extent of movement of the vehicle tires from one position to another for measuring toe-in may be accurately determined by noting the position of the bubble 79 in the spirit level.

To obtain accurate indications of toe-in it is essential that the members 17 and 17' engage the tires at equal distances above the floor or surface supporting the vehicle wheels. In the arrangement of my invention, an indication of the correct engagement of these members with the tires is accomplished by a second leveling device. To this end the rear face of member 38 is provided with a boss 84 to which is secured a spirit level casing 85, the same being held in position by means of a securing screw 86. The casing 85 contains a level glass 87 which is partially filled with a liquid to form a bubble 88. Thus the spirit level 87 determines a horizontal position of the reach bar assembly and associated mechanism and in this manner provides means for positioning the tire engaging members 17 and 17' equal distances above the surface supporting the vehicle.

The preferred procedure in obtaining a toe-in measurement or indication of dirigible wheels of a vehicle by utilizing the arrangement of my invention is as follows:

The vehicle is first placed with the steering or dirigible wheels disposed on a substantially horizontal floor or surface. The tire engaging members 17 and 17' are fitted into contact with the tires in a position at a point forwardly of a vertical plane through the axes of the wheels as shown in full lines in Figure 1. The tire engaging members 17 and 17' are elevated above the floor or supporting surface a sufficient distance until the bubble 79 in the level glass 78 attains a central position indicating that the axis of tube 36 is in a level or horizontal position. The tire engaging members 17 and 17' are adjusted vertically until the bubble 88 in the spirit level is in a central position, which condition indicates that the members 17 and 17' are elevated equal distances above the floor. The vehicle wheels are then rotated in a forward or counterclockwise direction as viewed in Figure 1 until the tire engaging members 17 and 17', housing 10 and mechanism carried assume the position shown in dotted lines in Figure 1. During this movement the gauge remains relatively stationary with respect to the supporting surface, the caster 42 compensating for the vertical components of movement negotiated by the housing 10 and reach bar assembly during arcuate movement from initial to the second position. The dotted position is shown merely by way of illustration as there is no substantial movement of the gauge construction in a longitudinal direction of the vehicle as the vehicle wheels are moved relative to the supporting surface and the gauge. After the proper engagement of members 17 and 17' has been had with the tire as indicated by position A in Figure 1, the operator grasps the indicator arm 48 and moves the same to the central position in registration with the zero index line 55 on the gauge plate 52. Such independent movement of the indicator arm 48 is permitted by reason of the friction type of drive connection between the grooved wheel 71 and the transversely extending rod 22. As the vehicle wheels move forwardly to shift the relative position of the gauge from position A to position B as indicated in Figure 1, the expansive spring 15 maintains the members 17 and 17' in frictional engagement with the tires and any lengthening or shortening of the distance between the members 17 and 17' is compensated for by relative sliding movement of the rod 22 within the tubular guide 12. This relative movement of the rod 22 is transferred through frictional engagement with the grooved wheel 70 to rotate the shaft 45 and cause movement of the indicator hand 48 relative to the gauge dial 52. If the amount of wheel "toe-in" for a certain vehicle is 2/16 of an inch, the indicator 48, after movement of the vehicle wheels to bring the gauge to the relative position indicated by position B, will register with the numeral 2 of the group of graduations designated 56 on the dial plate 52. If the vehicle wheels are improperly adjusted so that the wheels actually "toe-out" then the indicator 48 will register with one of the graduations of the group designated 57 on the dial plate 52. By this means the operator is apprised of the amount and condition of "toe-in" of vehicle wheels by direct indication viewed upon the dial plate 52 through the position of the indicator 48.

If a vehicle having a different width of tread such that the distance between the tires will not be compensated by the coil spring 15 in the gauge unit, the proper reach of the rod 22 and tubes 12 and 24 may be obtained by manually adjusting the relative position of tube 24 with respect to the shaft 22 by manipulation of the locking screw 29. By means of the provision of a friction drive between the shaft 22 and the indicator driving shaft 45, there is no liability for any of the parts to become broken or damaged through use and furthermore an accurate indication of "toe-in" is assured as there is no lost motion in the mechanism operating the indicator hand 48. The dial 52 and indicator hand 48 extend forwardly of the vehicle so that they are at all times in convenient position to facilitate the reading of indications of vehicle wheel "toe-in" condition.

The indicator gauge of my invention in normal use is employed with the initial reading or setting at position A and the vehicle wheels moved forwardly until the secondary gauge position is at B. I have found it preferable to use the gauge in conjunction with a forward rotative movement of the wheels in testing for wheel toe-in condition so that any lost motion in the wheel spindles or mountings will be present in the same manner as when the vehicle is driven forward in normal use. It is however to be understood that the initial gauge reading may, if desired, be had at position B and the secondary gauge reading had at position A by rotating the wheels in a reverse direction, but I have found that any lost motion or looseness in the wheel mountings and associated elements may in some instances interfere with the procurement of an accurate indication of the actual toe-in condition of the front wheels.

After a condition of toe-in of the steering wheels of the vehicle has been ascertained the gauge mechanism may be disengaged from the vehicle tires by manually exerting a transverse and inwardly directed pressure upon the tube 12 which acts to compress the spring 15 and free the elements 17 and 17' from contact with the vehicle tires 26 and 27.

It is apparent that, within the scope of the invention, modifications and different arrangements may be made other than is herein disclosed, and the present disclosure is illustrative merely, the invention comprehending all variations thereof.

What I claim is:

1. In combination, a gauge for determining the condition of vehicle wheels equipped with tires including a pair of relatively movable telescopically connected members adapted to engage the tires; a casing secured to one of said members; a shaft arranged at an angle to the axis of said telescopically arranged members, a tube connected to said casing; said shaft extending through said tube; a motion transmitting connection between one of said telescopically arranged members and said shaft for rotating the latter; a supporting element connected to said tube for supporting the latter upon a surface; and indicating means associated with said shaft and element for indicating relative movement of said telescopically arranged members.

2. In combination, a toe-in gauge for vehicle wheels including a housing; a tubular member secured to said housing; a rod slidably mounted in said tubular member; tire engaging elements respectively carried by said tubular member and said rod; resilient means associated with said rod and tubular member for urging the tire engaging elements outwardly; a tube secured to said housing and extending in a direction at right angles to the tubular member; a supporting fitting connected to said tube; a caster journaled upon said fitting and arranged to be supported upon a surface; a shaft disposed in said tube; means for transforming relative sliding movement between said rod and said tubular member into rotary motion of said shaft, and indicating means cooperating with said shaft for directly indicating the toe-in condition of vehicle wheels.

3. In combination, a gauge for determining the condition of toe-in of dirigible vehicle wheels including a pair of members arranged in telescoped relation; means including elements associated with said members engageable with the tires of vehicle wheels being tested; spring means associated with said telescopically arranged members for urging said elements into engagement with the vehicle tires; a housing secured to one of said members; a shaft extending into said housing; a wheel secured on the shaft and formed with a V-shaped peripheral groove frictionally engageable with the other of said members whereby relative slidable movement of said members is translated into rotary motion of said shaft; supporting means for said shaft; a dial associated with the supporting means; an indicator carried by said shaft and cooperatively associated with said dial for indicating toe-in condition of the vehicle wheels; said supporting means including a caster wheel; and means including a spirit level mounted upon said supporting means for determining initial and secondary positions of said tire engaging means during gauging operations.

4. In combination, a gauging apparatus for determining the condition of toe-in for dirigible vehicle wheels including a pair of members arranged in telescoped relation; means including elements associated with said members and engageable with the tires of vehicle wheels being tested; spring means associated with said telescopically arranged members for urging said elements into engagement with the vehicle tires; a housing secured to one of said members; a shaft extending into said housing; a wheel secured to the shaft and formed with a V-shaped groove engageable with the other of said members whereby relative slidable movement of said members is translated into rotary motion of said shaft; supporting means for said shaft; a dial carried by said supporting means; an indicator mounted upon said shaft and cooperatively associated with said dial for indicating toe-in condition of the vehicle wheels; said supporting means including a caster wheel; a spirit level carried by said shaft supporting means for indicating the condition of level of said telescoped members in the longitudinal direction thereof, and a second spirit level carried by said shaft supporting means and disposed in right angular relation to said first mentioned spirit level for determining initial and secondary positions of said telescoped members during gauging operations.

5. In combination, gauging apparatus for determining the condition of toe-in of dirigible vehicle wheels including members arranged in relatively slidable relationship; resilient means associated with said relatively slidable members for urging the same to their outermost positions; indicating means; a support for said indicating means connected to one of said members; a drive connection between said indicating means and one of said relatively slidable members; and a pair of spirit levels mounted upon said support and disposed in right angular relation to each other for determining the proper position of said gauging apparatus during gauging operations.

6. In combination, gauging apparatus for determining the condition of toe-in of dirigible vehicle wheels including members arranged in relatively slidable relationship; means associated with said members adapted for engagement with the tires of the vehicle wheels being tested; resilient means associated with said relatively slidable members for urging the same in a direction to retain the tire engaging means in engagement with the tires; a shaft angularly arranged with respect to the longitudinal axis of said members; supporting means connected to one of said members; said shaft journaled upon said supporting means; a drive connection between one of said relatively slidable members and said shaft whereby said shaft is rotated by relative movement of said members; indicating means associated with said shaft for determining the extent of movement of one of said members with respect to the other, a spirit level carried by said supporting means for indicating the condition of level of said telescoped members in the longitudinal direction thereof, and a second spirit level carried by said supporting means in right angular relation to said first mentioned spirit level for determining initial and secondary positions of said telescoped members during gauging operations.

7. In combination, a gauge for determining the condition of dirigible vehicle wheels including a pair of members arranged in extensible telescopic relationship, a casing associated with one of said members; a shaft extending into said casing; a wheel mounted on said shaft; an element disposed in said casing having a V-shaped recess formed therein; a pin carried by said casing and arranged to be received in the recess in said element whereby said element is arranged for movement about the axis of said pin; said shaft being journaled in said element; resilient means for urging said wheel into frictional engagement with one of said members, and indicating means connected to and driven by said shaft for indicating relative movement of one of said members with respect to the other.

8. In combination, a gauge for determining the condition of dirigible vehicle wheels including a pair of members arranged in relative slidable relationship, a casing associated with one of said members; a shaft extending into said casing; a wheel mounted on said shaft; an element disposed in said casing; said element being mounted for movement about a fixed axis; said shaft being journaled in said element; resilient means for urging said wheel into frictional engagement with one of said members, and indicating means connected to and driven by said shaft for indicating relative slidable movement of one of said members with respect to the other.

9. In combination, a gauge for determining the condition of vehicle wheels equipped with tires including a pair of relatively movable telescopically connected members adapted to engage the tires; a casing secured to one of said members; a shaft arranged at an angle to the axis of said telescopically arranged members; an element connected to said casing and substantially coextensively disposed relative to said shaft; a motion transmitting connection between one of said telescopically arranged members and said shaft for rotating the latter; a support connected to said element for supporting the latter upon a surface, and indicating means associated with said shaft and support for indicating relative movement of said telescopically arranged members.

THOMAS F. KRUMM.

REFERENCES CITED

The following references are of record in the file of this patent:

UNITED STATES PATENTS

| Number | Name | Date |
|---|---|---|
| 295,093 | Ashcroft | Mar. 11, 1884 |
| 1,239,192 | Lewis | Sept. 4, 1917 |
| 1,281,715 | Todt | Oct. 15, 1918 |
| 1,285,431 | Shipwash | Nov. 19, 1918 |
| 1,427,773 | Barrett | Sept. 5, 1922 |
| 1,520,928 | Brown et al. | Dec. 30, 1924 |
| 1,898,074 | Bailey | Feb. 21, 1933 |
| 2,003,188 | Heid | May 28, 1935 |
| 2,048,407 | Price | July 21, 1936 |
| 2,192,900 | Eisele | Mar. 12, 1940 |
| 2,401,715 | Wilkerson | June 4, 1946 |

FOREIGN PATENTS

| Number | Country | Date |
|---|---|---|
| 2,946 | Great Britain | 1910 |
| 28,854 | Great Britain | 1896 |